Dec. 24, 1968 G. R. BRÖCKEL ET AL 3,417,916

METHOD AND APPARATUS FOR RECORDING WEAVING DATA

Filed March 25, 1966

5 Sheets-Sheet 1

Inventors
GERHARD RUDOLF BRÖCKEL
RONALD J. HUG
KURT RÜTSCHI

BY Pennie, Edmonds, Morton, Taylor and Adams
ATTORNEYS

METHOD AND APPARATUS FOR RECORDING WEAVING DATA

Filed March 25, 1966 5 Sheets-Sheet 2

Inventors
GERHARD RUDOLF BRÖCKEL
RONALD J. HUG
KURT RÜTSCHI
BY Pennie, Edmonds, Morton, Taylor and Adams
ATTORNEYS Inventors
GERHARD RUDOLF BRÖCKEL
RONALD J. HUG
KURT RÜTSCHI
BY Pennie, Edmonds, Morton, Taylor and Adams
ATTORNEYS Inventors
GERHARD RUDOLF BRÖCKEL
RONALD J. HUG
KURT RUTSCHI
BY Pennie, Edmonds
Morton, Taylor and Adams
ATTORNEYS Inventors
GERHARD RUDOLF BRÖCKEL
RONALD J. HUG
KURT RUTSCHI
BY Pennie, Edmonds
Morton, Taylor and Adams
ATTORNEYS United States Patent Office 3,417,916

Patented Dec. 24, 1968

3,417,916

METHOD AND APPARATUS FOR RECORDING WEAVING DATA

Gerhard Rudolf Bröckel, Winterthur, Ronald J. Hug, Wiesendangen, and Kurt Rütschi, Sulz-Attikon, Switzerland, assignors to Sulzer Brothers Limited, Winterthur, Switzerland, a company of Switzerland Filed Mar. 25, 1966, Ser. No. 537,496
Claims priority, application Switzerland, Apr. 6, 1965, 4,777/65
5 Claims. (Cl. 234—1)

ABSTRACT OF THE DISCLOSURE

There is disclosed a method and apparatus for recording, on a single punched tape, of operational data pertaining to a plurality of looms. Each loom is connected to a separate data storage device and presents to that device a signal representative of a loom operating condition, e.g., no warp threads broken, or one or more warp threads broken. Periodically the storage devices are scanned in succession to compare the data stored therein with the signal presented thereto, and in the event of a disparity detected at any of the storage devices (representative of a change in operational condition for the loom to which that storage device pertains since the last previous scanning), the content of the storage device is changed to reflect the new operational condition. Moreover, each such detected disparity causes recording on the tape of a group of punches representative of the change in loom condition, of the identity of the loom affected, and of the time of occurrence of that change.

The present invention pertains to a method and apparatus for recording data in a weaving operation.

In the prior art systems for recording weaving data known to us, the record tape advances continuously, the tape having as many columns or "levels" as there are looms whose operation is to be recorded. If a loom is stopped, for example in the event of breakage of a warp thread, record marks such as dashes are continuously entered on the tape in the column pertaining to that loom until the loom is restored to operation. An indication of the reason for interruption in the operation of the loom, such as breakage of a warp thread, is also printed on the tape adjacent the marks indicating the time of nonoperation. In addition, there are provided for each loom a number of counters from which can be read in respect to each type of malfunction the number and time of occurrence of such interruptions.

For many purposes however the results of this prior art method are not readily usable. It is an object of the invention to provide a method and apparatus facilitating use of such data especially in large operations involving a large number of looms.

In accordance with the invention the data representing the individual occurrences, e.g., malfunctions, and the times at which they take place are recorded one after another, optionally together with the identifying numbers of the looms involved, in a single perforated tape suitable for use in a computer. This tape, after recording thereon by perforations representative of one such event, is ready for recording of the next event and comes to rest while awaiting that event. Such a mode of operation can be referred to as linear recording. The data recording apparatus of the invention includes a device to store the signals coming from the looms or from a manual signal generating device, a device which sequentially interrogates this storage device in respect of the storage therein of signals from the various looms and from any manual inputs thereto, and a tape punching device controlled by this interrogator.

In this way there is obtained a single record member on which are permanently recorded signals representative of all of the events of interest in the weaving room and of the time occurrence thereof as well as, desirably, the identifying numbers of the looms involved. This record can at any time be supplied to a computer for evaluation. With the present invention it is not necessary to relate the data to each other as is the case in the method of the prior art, where the time of occurrence of each event must be read off of the tape from a time reference mark, together with the aggregate number and duration of the events.

With the method and apparatus of the invention it is possible, for example, to handle operational, statistical and supervisory problems of production control and problems concerning the productivity of the labor employed, and also payroll computations. By means of the method of the invention it is possible, from evaluation of the punched tape in a computer, to ascertain, effect or compute:

(a) The length of time during which each loom was in operation, for example within a given shift;

(b) The number of interruptions of a specified minimum time duration irrespective of the cause or nature thereof;

(c) classification of interruptions according to the cause thereof;

(d) The duty cycle of each loom, i.e., ratio of actual operating time to potential maximum operating time;

(e) Payroll computation for the loom operators as a function of the productive time of the looms in the charge of those operators individually;

(f) Signalling of when the length of warp threads on the warp beams falls to a certain level;

(g) Identification of those looms which during a given period underwent more than a specified number of operational interruptions;

(h) Distribution of employee working time among various tasks such as repair of warp threads breakage generally and additionally distribution of such repairs among various portions of the machine as within the shafts, at the reed and so on;

(i) Waiting time between occurrence of a malfunction and beginning of repair thereof versus time required for actual repair;

(j) Time studies for determination for example of the average time required for correction of thread breakage on a large number of machines, of lost time between the occurrence of a malfunction as by thread breakage and initiation of repair thereof due to preoccupation of personnel with repairs on other looms;

(k) Methods for optimizing production in respect to utilization of labor;

(l) Simulated weaving operation such as theoretical running through of a specified operating time of the weaving room under controlled conditions such as various weft or warp thread material, variations in temperature and humidity, etc.; and (m) Determination of rest periods of the employees.

The invention will now be further described in the terms of a nonlimitative exemplary embodiment and with reference to the accompanying drawings in which.

Figure 1:
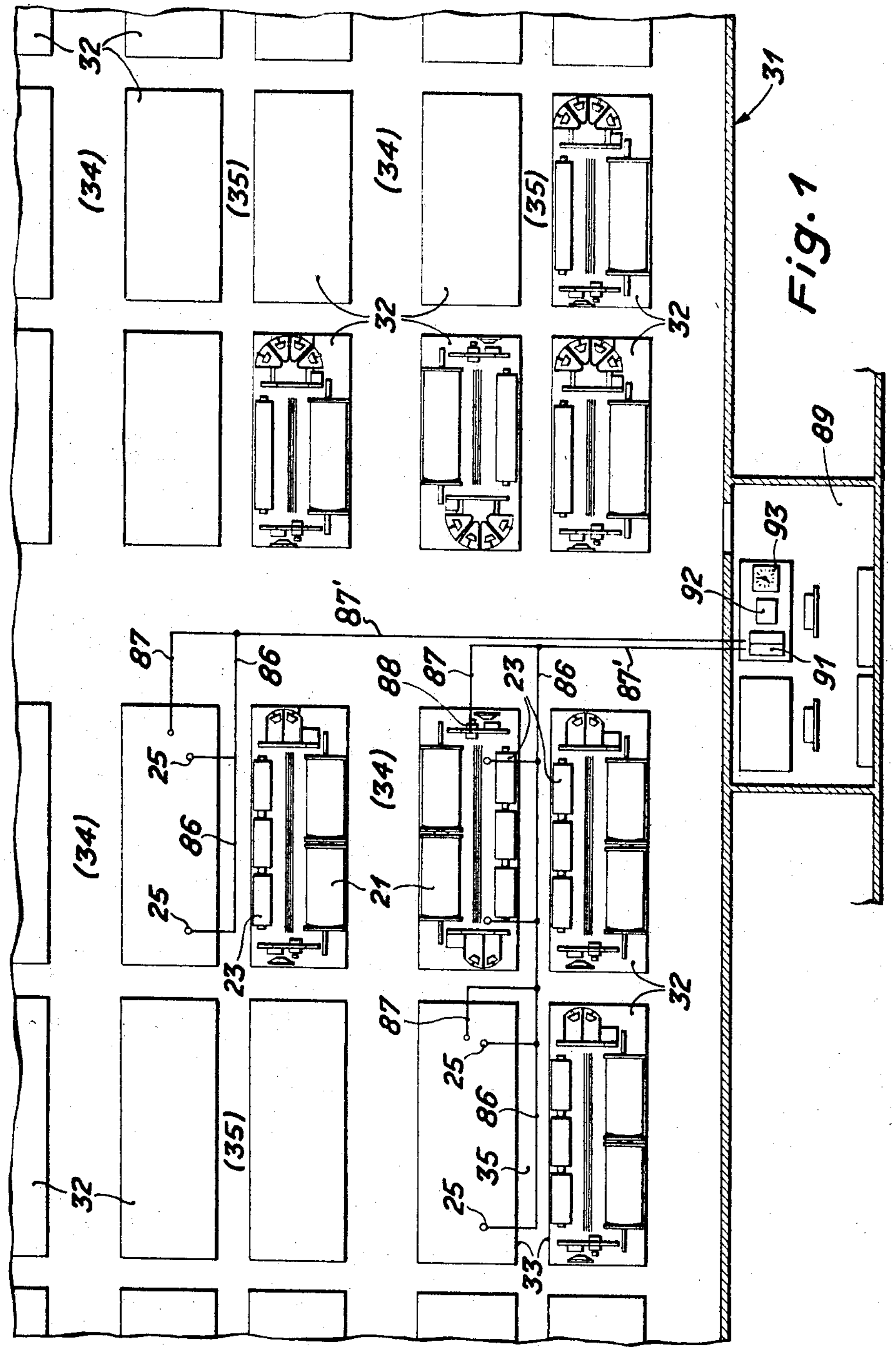
FIG. 1 is a fragmentary schematic plan view of a weaving room and adjacent space according to the invention.

Refering to FIG. 1, the weaving room 31 contains a large number of looms 32, which may be as many as a hundred or more in number, only a few being shown in any detail. The machines are positioned in pairs with the cloth beam sides or ends of the two machines of a pair adjacent to each other so that the warp beams 21 thereof are on opposite sides of the wide interloom spaces 34 whereas the cloth beams 23 thereof are adjacent the narrow passageways 35.

Figure 2:
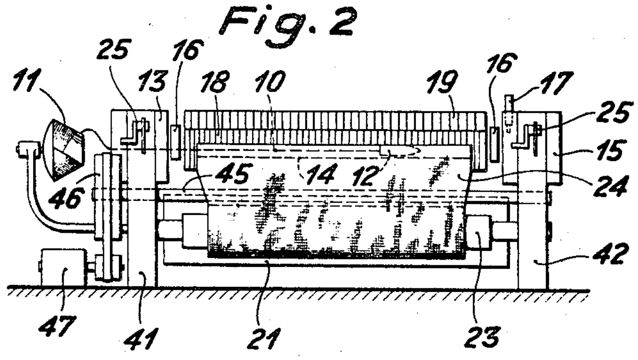
FIG. 2 is a simplified view in end elevation of an individual loom seen from the cloth beam end thereof.

As indicated in FIG. 2, each loom includes two uprights 41 and 42 which are connected to each other by intermediate members not shown. The loom is driven by a motor 47 coupled to a main shaft 45 which carries a flywheel 46, the flywheel incorporating a brake and clutch. Various machanisms of the loom disposed in the picking and catching devices 13 and 15 are driven from the main shaft 45. The gripper shuttle 12 is projected from the picker to the catcher and in doing so draws the weft thread 10 through the shed formed by the shafts 19. The weft thread is thereupon beaten up by the reed 18. The weft thread supply spool is shown at 11. The cloth 24 is wound up on the cloth beam 23.

Figure 3:
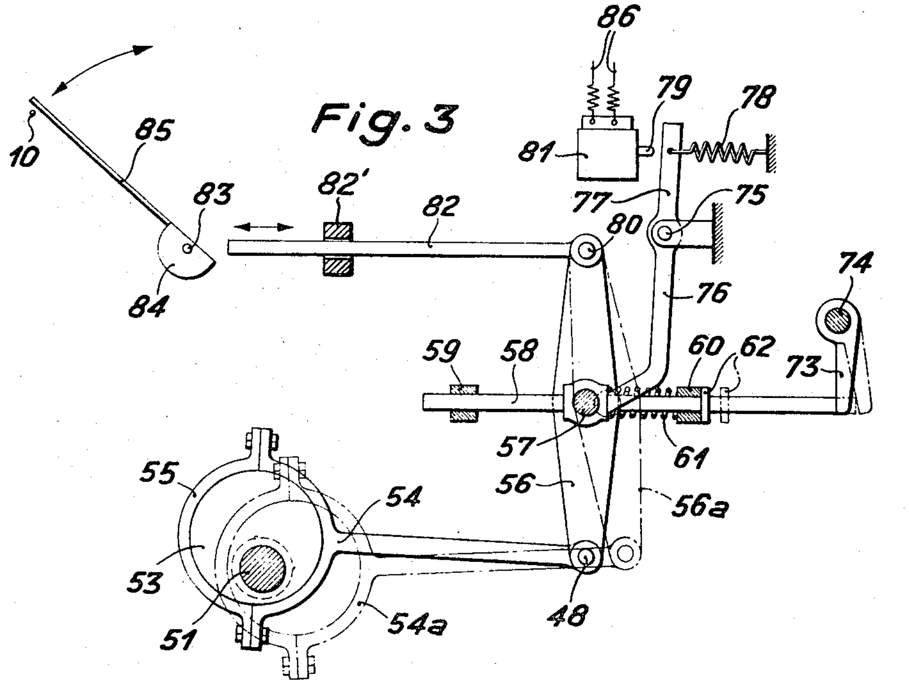
FIG. 3 shows a detail of the loom of FIG. 2, at an enlarged scale.

Various appropriate thread supply and transfer devices are provided at the picking and catching mechanisms 13 and 15. These are shown schematically in the drawing at 16 and include thread end delivery means, edge thread clamps, shears, thread centering devices, selvage insertion needles and width maintenance devices and the like. The catcher 15 additionally includes a detector or monitor 17 which develops a signal whenever, after insertion of the shuttle by the picking mechanism, the shuttle is not received in the catcher.' In that event, the signal generated by the device 17 serves automatically to stop the loom. A weft thread monitoring device 25 is provided on the loom, and indeed two such devices may be provided thereon, one at each side of the warps, one adjacent the picker and one adjacent the catcher. This device is further illustrated in FIG. 3. In FIG. 3, an eccentric 53 fastened to a shaft 51 which is coupled to the main loom shaft drives a connecting rod 54 having a cap 55 on the eccentric. The connecting rod 54 is pivotally connected at 48 to a lever 56 pivoted in turn at 57. The bearing or pivot 57 is supported on a rod 58 which in turn is supported for rectilinear motion in two fixed bearings 59 and 60. A spring 61 stresses the rod 58 to the left in FIG. 3, toward the position in which a stop 62 affixed to the rod brings up against the bearing 60. The right-hand end of the rod 58 works against a lever 73 fastened to a shaft 74. A two-armed lever 76, 77 is pivoted at a fixed point 75 and is subjected to a torque by a tension spring 78 tending to rotate the lever 76, 77 clockwise as shown in FIG. 3. The arm 76 of the lever thus bears against the bearing 57. The arm 77 on the other hand, when rotated counterclockwise, engages the actuating arm 79 of a microswitch 81 to close that switch.

At the upper end thereof the lever 56 is connected at a pivot 80 to a rod 82 supported for rectilinear motion by bearings 82'. Adjacent the free end of the arm 82 remote from the pivot 80 there is disposed a lever 85 pivoted at 83. A semicircular plate 84 is affixed to lever 85 concentrically with the pivot 83. The lever 85 serves as a weft thread sensing element, sensing the presence of the thread 10 after every picking operation. If the thread is present and not broken the counterclockwise rotation of lever 85 under influence of gravity will be limited by the thread to the position shown. Hence the left end of the rod 82 will, on leftward motion pass freely to the left above plate 84. If instead the thread 10 is broken, lever 85 will rotate farther counterclockwise in FIG. 3 so that the semicircular portion 84 of the feeder will block the path of the rod 82. Consequently, in the latter event, when shaft 51 drives the connecting rod 54 to the position shown therefor in chain dotted lines at 54*a*, the lever 56 will be caused to rotate about its upper end 80 as a stationary pivot, so that the lever 56 will take up the position shown therefor in chain dotted lines at 56*a*. The bearing 57 and the rod 58 will be shifted to the right; the scanning shaft 74 will be rotated counterclockwise, and by means of linkage connected thereto the loom will be stopped. At the same time the lever 76, 77 will be rotated counterclockwise to close the microswitch 81. By means of the circuit 86 of FIGS. 1 and 3, a signal indicative of weft thread breakage will be transmitted to the data collecting system to be further described below.

Signal lines 87 similar to the lines 86 extend from the terminal box 88 of each loom, these lines 87 being connected in circuit with the warp thread monitoring devices of the looms and with means to indicate whether the drive motors 47 thereof are energized and the like. That is to say, for each loom there are provided separate signalling circuits extending to the space 89 for one or more of the functions such as weft thread breakage, warp thread monitoring (the means for which have not been illustrated), drive motor voltage, drive motor control switch position, etc.

Figure 4:
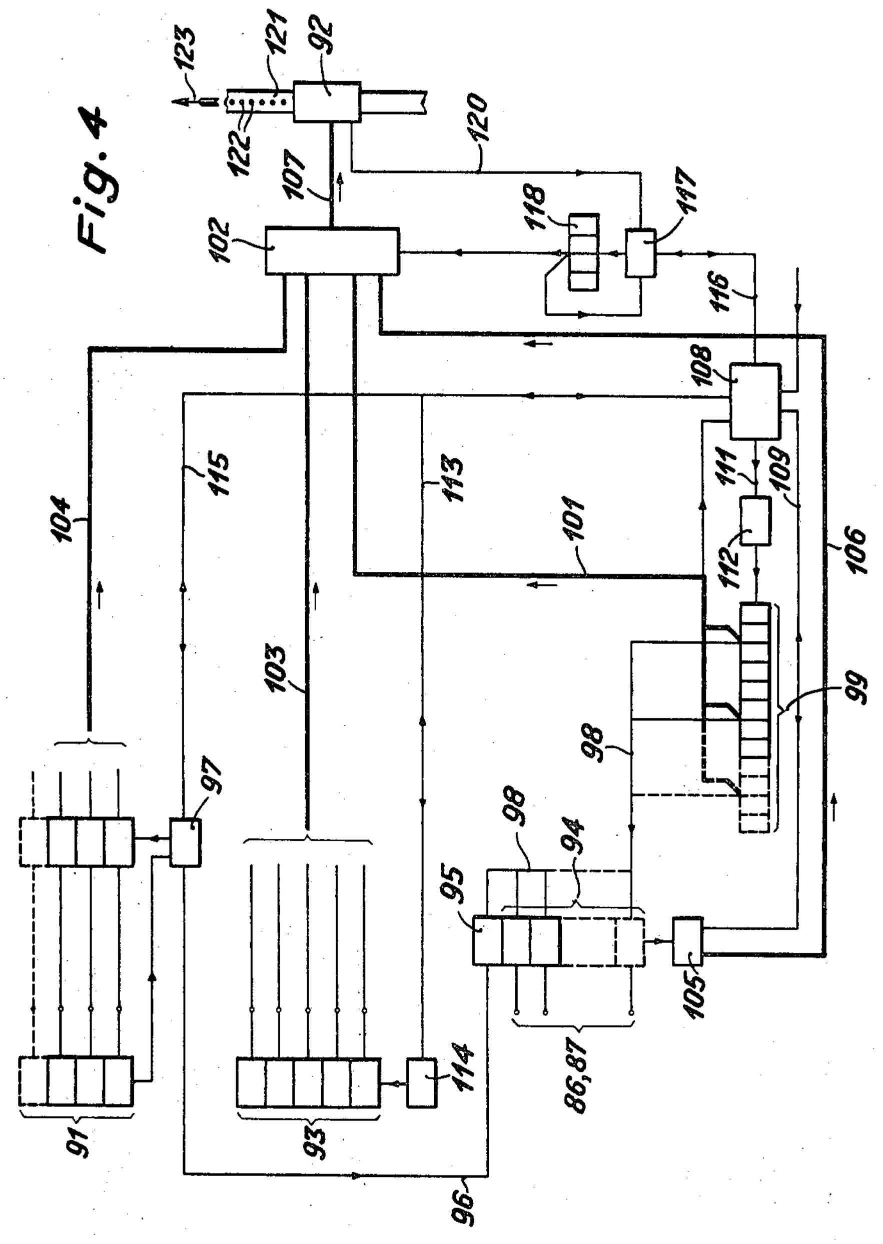
FIG. 4 is a circuit diagram of the data collection system of the invention.
Figure 5:
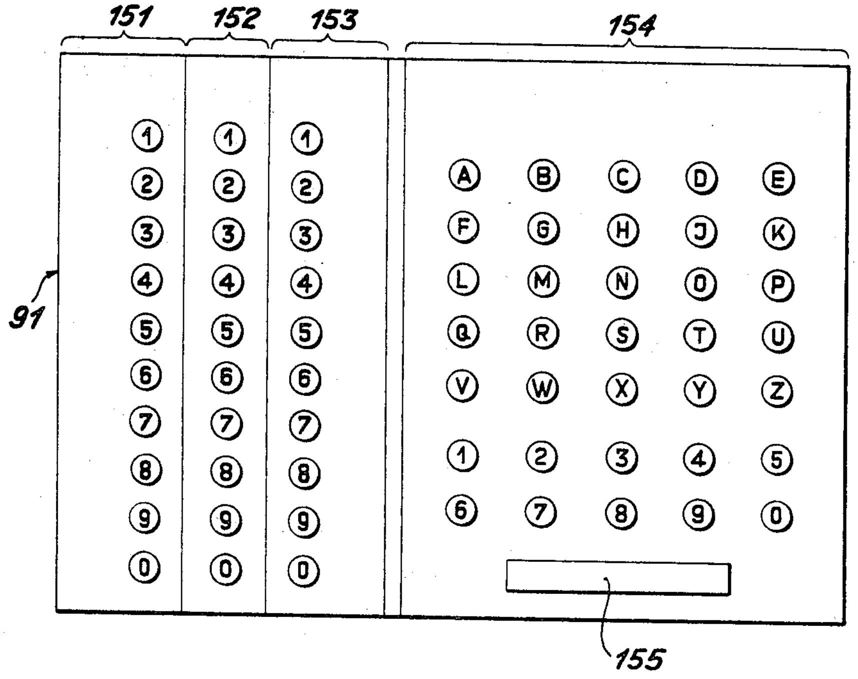
FIG. 5 is a diagram of the manual information insertion device of the system of FIG. 4.

In FIG. 1, the reference character 87' identifies for each loom a cable carrying these circuits for one loom. Thus whenever a warp thread breaks or a loom is stopped for some other reason a signal is delivered over the corresponding line 87 from that loom to the data collecting apparatus. This apparatus is disposed in a control room 89 and comprises a manual data input device 91 as shown in FIGS. 1, 4 and 5. It also comprises a tape perforating device 92, a digital clock 93 and other elements to be described hereinafter.

In the schematic diagram of the data collecting apparatus of FIG. 4, data transmission channels within the apparatus for the transmission of such data as loom identifying numbers and signals for breakage of warp and weft threads and also data manually inserted at the device 91 are shown as double lines. Control signal channels on the other hand are shown as single lines. The signal lines 87 from each loom connect to input storage devices 94, a separate storage device 94 being provided for each loom. A further input storage is provided at 95 connected in parallel to the loom input storage devices and is connected via a control line 96 with the control device 97 for the manual insertion device 91.

An electronic input counter 99 is connected to the input storage devices 94 and 95 via lines 98 for control or scanning. A data line 101 for transmission of loom identifying machine numbers leads from the input counter 99 to a multiplex switching device 102. A data line 103 carrying digital time signals from the clock 93 also feeds into the switching device 102, as does a data line 104 for manually inserted data. The switching device 102 also receives as input over a data line 106 from a control device 105 data concerning the cause or nature of malfunctions and concerning the restarting of the looms. From the multiplexing device 102 a data line 107 extends to the tape perforator 92.

The input storage control device 105 is connected to a central control box 108 by the means of a control signal line 109. The input control element 112 of the input counter is connected to the control box 108 via a control line 111. The control 114 of the digital clock is connected to the control box 108 via a control line 113. The manual insertion device control element 97 is connected to control box 108 via control line 115. The control elements 117 and 118 for the multiplexer 102 and perforator 92 are connected to the box 108 through the control line 116.

The tape punch 92 is additionally connected by a control line 120 with the control 117 so that the tape 121, which is discontinuously advanced by means of sprocket-type holes 122 in the direction of the arrow in FIG. 4 after each punching operation, will be punched and advanced in accordance with the signals arriving on the data lines 101, 103, 104 and 106 as transmitted through the multiplexer 102 over data line 107.

The mode of operation of the apparatus is as follows. The data collection apparatus of FIG. 4 is so constructed that every interruption in the operation of a loom as a result of one or more different types of malfunction such as weft thread breakage, or warp thread breakage or for any other reason (as for example nonentry of the shuttle into the catcher, indicated by the monitor 17 of FIG. 1) will be automatically punched into the tape 121 by the automatic devices 94 and 99. Between such automatic punchings, manually inserted data introduced by operation of the keyboard device 91 may be given to the tape to record other events such as change in warp beams, change in the weft thread material, change of weft thread spools 11, or the like.

In the case of information pertaining to a loom introduced automatically over the lines 86 and 87, the number identifying the loom in question will be automatically punched into the tape by operation of the input counter 99. In the case of information manually inserted via the keyboard device 91, and which pertains to a particular machine, the corresponding machine number must be inserted by hand. If the event to be recorded is not related to a particular machine, the number 000 will be punched in. Interruption of loom operation as a result of warp thread breakage may be indicated by the code number 1, interruption due to weft thread breakage by the code number 2 and interruption for other reasons by the code number 9 punched into the tape. Each punching is accompanied automatically by punch-in of the corresponding time, signals for which are delivered from the digital clock 93.

Figure 6:
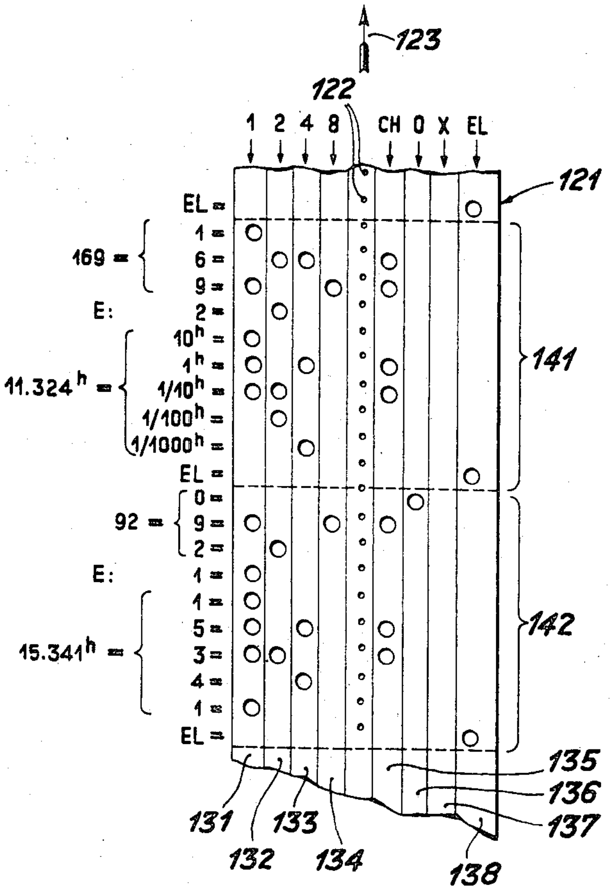
FIG. 6 is a fragmentary view of the punched data tape of the invention.

FIG. 6 shows in detail a sample of the tape 121. The punching may be effected according to an eight channel or eight "level" code, the channels being identified by reference characters 131 to 138 in FIG. 6. The levels 131 to 134 may be employed for recording binary numbers, punches in these levels having respectively the decimal values 1, 2, 4 and 8. Holes punched in a plurality of these levels at a common position lengthwise of the tape are to be added together to obtain the value of the one-digit decimal number recorded in binary form at that position.

Sprocket hole perforations for effecting advance of the tape are shown at 122.

To the right of the sprocket holes 122 channel 135 is employed for so-called check perforations, identified as CH in FIG. 6. A hole in the channel 136 denotes the number zero. A punch in the channel 137 denotes an arbitrary event X whereas one in the channel 138 constitutes the "end of line" symbol indicating the end, lengthwise of the tape, of punchings pertaining to a particular event. Two such events are identified in FIG. 6 by means of reference characters 141 and 142.

By means of the input counter 99 any desired number such as 100 input storage devices 94 may be scanned per second. Each of the storage devices 94 stores at any instant intelligence representing the operating condition of a separate loom, indicating for example that it is in operating condition. By operation of the counter 99 comparison is effected to determine whether the stored information coincides with the instantaneously existing operating condition of the loom. In the event of a difference, the counter 99 is temporarily stopped and the event entered into the corresponding store 94 together with the time (from the clock 93) is punched into the tape.

If for example in loom No. 169 the weft thread 10 breaks at 11 hours 19 minutes 26.4 seconds, the feeler 85 of FIG. 2 will move downwardly until the loom is stopped by operation of the apparatus shown in FIG. 3, and an electric signal will be delivered via line 86 of that loom to the input storage device 94 pertaining to loom No. 169. Upon scanning of the store by the counter 99, the counter stops and the store is set to store the new condition of operation of the loom (i.e., nonoperation). Thereupon the machine number "169" is punched into the tape as indicated in FIG. 6 in the first three positions lengthwise of the tape. Then the event, abbreviated "E" in the legend on FIG. 6, is punched into the tape. Since the event is assumed to be a weft thread breakage for which the code symbol is the decimal number 2, it is recorded on the tape as a single perforation in column 132. The time of occurrence of this event, signals for which are received from clock 93 and which time is assumed to be 11:19:26.4 hours or 11.324 hours in decimal terms, is punched into the tape, one decimal digit per position lengthwise of the tape with each digit being recorded in binary form. Lastly comes the end of line symbol "EL" concluding the message 141. The tape is then advanced so that the next tape interval 142 can be punched as soon as an event to be recorded occurs. Until the occurrence of such event, the tape will be stationary.

It has been assumed for the tape section 142 that a warp thread breaks at loom No. 92 and at time 15.341 hours. By means of a warp thread monitoring device on that loom, not shown in the drawing but which may include a blade which is allowed to fall when a warp thread is broken and which thereby completes an electric circuit, an electric signal is delivered from the switching device 88 of that loom and is fed over line 87 to the store 94 belonging to loom No. 92. Upon scanning of this store by the counter 99, the changed status of the store is detected and the loom identifying number 092 will be punched into the tape. Thereupon there is punched in the event code 1, identifying warp thread breakage, and thereafter the number 15.341 hours and lastly the end of the line symbol. The tape is then ready for the next punching operation.

If for example during operation of loom No. 157 it is necessary to change the warp thread beam (which event is identified by a suitably coded symbol such as a punch in the "X" column 137), the loom operator will record this fact on the tape by means of the manually operated keyboard input device 91. First he will punch in the machine identifying numbers on the 1, 5 and 7 keys of key columns 151, 152 and 153. He will then punch key X on the event-identifying keyboard 154. The operated keys may light up to indicate operation thereof. The operator then presses the transmit button 155 so that corresponding signals pass via the data lines 101 and 104 to effect the punching of the tape 121.

After repair of the broken weft thread at loom No. 169 there will automatically occur, on restarting of that loom, a corresponding punched recording on the tape. This will include the number of the loom, the event (i.e. resumption of weaving), and the time. Similarly, automatically upon correction of the broken warp thread on loom No. 92 and manually upon completion of the warp beam change at loom No. 157, the tape will be advanced and punched to record those events.

If there is to be manually inserted onto the tape an event not pertaining to a particular loom such as the end of a work shift or the beginning or end of a rest period for any particular employee, then the punching operation is only that of a corresponding event key in the portion 154 of the keyboard device 91, no number in the loom identifying key columns 151 to 153 being punched. The result will automatically be appearance on the tape of the number 000, signified by punches in the column 136 at the first three positions lengthwise of the tape after the end of line symbol punch in column 138 which identifies the end of the previously punched message.

This so-called linear recording of events does not produce a continuous record of the operating condition of the individual looms. Rather, it records in time succession each change in condition of a loom such as stoppage thereof due to warp thread breakage, restarting after repair of thread breakage and the like. After each punching operation the tape will advance to be ready for the recording of the next event thereon. The continuing operation of the looms is not recorded, rather only changes in the condition thereof such as restoration to operation after interruption. Nothing is recorded during continuous operation.

The punched tape so obtained by means of the apparatus of FIGS. 4 and 6 is available for evaluation by means of a computer which may be programmed in any of a wide variety of ways.

In the case of large loom installations, the computer may be continuously connected to the data collection system of the invention and operate exclusively in conjunction therewith. In other cases, the tapes 121 obtained may be employed with a computer operating only in part therefor, the computer serving at other times for other purposes such as payroll computations.

The number of looms connected to the input storage devices 94 and hence the number of those devices may vary widely, as indicated by the dotted indications in FIG. 4. Likewise, the scope of the manual insertion device 91 may vary in extent, for example, as to the alphanumeric portion 154 thereof. In addition, the system may be so arranged that either more or fewer than three different events of types of events may be automatically recorded. In another embodiment, the manual data insertion device 91 may be dispensed with, the system operating only to effect automatic recording of limited types of occurrences.

The coding and disposition of the data on the tape 121 can likewise take place in various ways. The manual input device 91 may be of portable construction, connectable to the system at various places so that manual insertion can be effected into the sysem from various points within the weaving room.

While the invention has been described herein in terms of a presently embodiment, the invention itself is not limited thereto but comprises rather all modifications on and departures from that embodiment properly falling within the spirit and scope of the appended claims.

We claim:

1. A method of recording operational data relating to a plurality of looms, including the steps of transmitting from each loom to a corresponding one of a series of separate storage devices at a common location a signal representative of an operational condition of said loom, periodically scanning said storage devices in succession and comparing the previously stored data in each storage device with the actual operational condition of the corresponding loom, replacing the previously stored data in each storage device by appropriate new data in the event of a change having occurred since the last scan, and recording in succession on a common tape a plurality of data groups each of which represents the change in operational condition of one of said looms detected in said comparison step and the time of performance of said comparison step.

2. Apparatus for recording operational data relating to a plurality of looms, said apparatus including for each of said looms a storage device for storing operational data on that loom, a signal line extending from each loom to the corresponding storage device for transmission thereto of loom-condition representative signals, means to periodically scan the storage devices sequentially and to compare the data stored in each with the signal on the corresponding ones of said lines and in the event of a disparity to replace the stored data by appropriate new data, and means to record on a common tape successively data groups representative each of a change in data stored in one of said storage devices and representative further of the time of operation of said scanning and comparison means at which said disparity was detected.

3. Apparatus according to claim 2 including a source of digital time signals, and means to connect said time signal source to said recording means upon each recording by said recording means of a change in data stored in said storage devices.

4. Apparatus according to claim 2 including manually operable means to supply data to said recording means and means to connect said manually operable means to said recording means.

5. Apparatus according to claim 4 wherein each loom includes a member movable from a first position to a second position in the event of a change in the operational condition of the loom, and a microswitch positioned to be actuated by such movement and connected in circuit with signal line extending from the loom to the corresponding storage device.

References Cited

UNITED STATES PATENTS

| | | | |
|---|---|---|---|
| 3,059,238 | 10/1962 | Quinn | 346—34 |
| 3,099,512 | 7/1963 | Kohler | 234—58 X |
| 3,226,726 | 12/1965 | Adams et al. | 346—34 |

WILLIAM S. LAWSON, *Primary Examiner.*

U.S. Cl. X.R.

234—54, 58; 139—1; 346—34, 50